(12) United States Patent
Runkana et al.

(10) Patent No.: US 11,307,327 B2
(45) Date of Patent: Apr. 19, 2022

(54) METHOD AND SYSTEM FOR ONLINE MONITORING AND OPTIMIZATION OF MINING AND MINERAL PROCESSING OPERATIONS

(71) Applicant: Tata Consultancy Services Limited, Mumbai (IN)

(72) Inventors: Venkataramana Runkana, Pune (IN); Nagaravi Kumar Varma Nadimpalli, Pune (IN); Aditya Pareek, Pune (IN); Vishnu Swaroopji Masampally, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 328 days.

(21) Appl. No.: 16/662,719

(22) Filed: Oct. 24, 2019

(65) Prior Publication Data

US 2020/0132882 A1 Apr. 30, 2020

(30) Foreign Application Priority Data

Oct. 26, 2018 (IN) .............................. 201821040541

(51) Int. Cl.
  *G06N 20/00* (2019.01)
  *G01V 99/00* (2009.01)
  (Continued)

(52) U.S. Cl.
  CPC ............ *G01V 99/005* (2013.01); *E21B 47/00* (2013.01); *G06N 5/003* (2013.01); *G06N 5/04* (2013.01); *G06N 20/00* (2019.01)

(58) Field of Classification Search
  CPC ........ G01V 99/005; G06N 20/00; G06N 5/04; G06Q 10/04; G06Q 10/06393
  See application file for complete search history.

(56) References Cited

U.S. PATENT DOCUMENTS

2014/0144342 A1 5/2014 Bye
2016/0314421 A1* 10/2016 Watkins ............. G06Q 30/0206

FOREIGN PATENT DOCUMENTS

CN 103778469 5/2014

OTHER PUBLICATIONS

Nakhaei et al., Prediction of Copper Grade at Flotation Column Concentrate Using Artificial Neural Network, 2010 IEEE, ICSP2010 Proceedings, pp. 1421-1424 (Year: 2010).*

(Continued)

*Primary Examiner* — Toan M Le
(74) *Attorney, Agent, or Firm* — Finnegan, Henderson, Farabow, Garrett & Dunner, LLP

(57) ABSTRACT

Monitoring and analysis of plurality of operations in mining and mineral processing is critical to achieve optimized performance. Existing tools are specific to one or other individual operations and this individuality introduces limitations for end to end monitoring of entire mining to mineral processing operations. Method and system for online monitoring and optimization of mining and mineral processing operations providing an integrated approach utilizing short-term mining plan data, information generated using established drill and blast design software, simulation models of fragmentation, crushing, screening, grinding and flotation to arrive at an optimized charge plan and set points for controllers is disclosed. The proposed method and system improves key performance indicators such as cost of mining operations, specific energy consumption in comminution circuit, maximizes yield of desired particle size, and maximizes grade and recovery of mineral of interest while considering operational constraints.

15 Claims, 13 Drawing Sheets

(51) Int. Cl.
*E21B 47/00* (2012.01)
*G06N 5/00* (2006.01)
*G06N 5/04* (2006.01)

(56) References Cited

OTHER PUBLICATIONS

Nageshwaraniyer, S.S. et al. (2018). "A mine-to-mill economic analysis model and spectral imaging-based tracking system for a copper mine," *Journal of the Southern African Institute of Mining and Metallurgy*, vol. 118; pp. 7-14.

Xingwana, L. (2016). "Monitoring ore loss and dilution for mine-to-mill integration in deep gold mines: a survey-based investigation," *Journal of the Southern African Institute of Mining and Metallurgy*, vol. 116; pp. 149-160.

* cited by examiner

METHOD AND SYSTEM FOR ONLINE MONITORING AND OPTIMIZATION OF MINING AND MINERAL PROCESSING OPERATIONS

PRIORITY CLAIM

The present application claims priority from Indian provisional patent application no. 201821040541, filed on Oct. 26, 2018. The entire contents of the aforementioned application are incorporated herein by reference.

TECHNICAL FIELD

The disclosure herein generally relates to digital monitoring and optimization technique(s), and, more particularly, to system and method for mine to mill online digital monitoring and optimization of mining and mineral processing operations.

BACKGROUND

Monitoring and plant wide optimization is critical for safety and profitability of plant operations. Typically, for mining and mineral processing operations it is important that maximum parameters in the end to end process are monitored, wherein the end to end process includes multiple diverse operations such as blasting, hauling, stock-piling, crushing, grinding, and flotation and concentration. Continuous monitoring of important parameters that control and characterize the performance of these operations along with quantifying the effect of variations in such parameters on key performance indicators (KPIs) of each of these unit operations and accordingly adjusting the parameter values to finally optimize KPIs of mining and mineral processing operations is desired. For example, take the case of comminution circuit operations that comprise processing of ore coming from stockpile through crusher and grinding mills that perform crushing, and grinding operations. Water addition, slurry density, feed grade, hardness and size distribution, rotational speed of mills, operational setting of crusher, recycle ratios of the intermediate streams are some important variables that affect the KPIs of interest such as final particle size distribution of the processed ore particles, specific energy consumption and total solids throughput through the comminution circuit. Online optimization of KPIs in response to changes sensed through monitoring of ore hardness and size of the ore fed which are disturbances affecting the KPIs will help improve the performance.

Many existing methods providing mine-to-mill modelling and tracking are available. However, one of these existing methods focuses only on the effect of blasting on shoveling and comminution operation. The impact of these operations on the further downstream operations is not taken into account, thus may not provide optimized operation of entire chain of operations. Further, the existing method limits to manipulation of the amount of explosives to be used for a given blasting operation so as to minimize costs and does not monitor and quantify the effect of many other important parameters that are known to affect the performance.

Yet another existing method focuses only on optimizing blast parameters such as blasthole, spacing and charge deepness so as to minimize distance of flyrock produced on blasting which is hazardous/risky for the personnel working on the mining site. Yet another existing blasting method for beneficiating minerals restricts only to a special case where mineral concentration is highly non-uniform and is present in orebody in lean and rich patches.

SUMMARY

Embodiments of the present disclosure present technological improvements as solutions to one or more of the above-mentioned technical problems recognized by the inventors in conventional systems. For example, in one aspect, there is provided a processor implemented method for online monitoring and optimization of mining and mineral processing operations, the processor implemented method comprising: fetching from a plurality of data sources, by one or more hardware processors, data for a set of variables corresponding to a set of sensors associated with the mining and mineral processing operations; pre-processing, by the one or more hardware processors, the fetched data corresponding to the set of variables by discarding outliers, performing imputation for adding artificial values at missing positions, organizing data collected at different frequencies to one common frequency, identifying and selecting data based on steady state operation of a process or a sub-process associated with the mining and mineral processing operations; determining, by the one or more hardware processors, standard operating condition for the mining and mineral processing operations using the pre-processed data corresponding to the set of variables; segregating, by one or more hardware processors, each variable among the set of variables into one of the drilling and blasting operations, hauling operations, comminution operations, and the flotation and concentration operations, wherein segregation is performed in accordance with a master tag list; generating, by one or more hardware processors, a set of models based on the segregated set of variables and preprocessed data, wherein the set of models is generated for a set of Key Performance Indicators (KPIs) of interest and a plurality of process parameters of interest associated with the mining and mineral processing operations, wherein the generated set of models comprise a set of Machine learning (ML) models, a set of individualized physics based models or a set of hybrid models, wherein the set of individualized physics based models and the set of hybrid models are generated for the plurality of process parameters based on known physics based models by determining model parameters using non-linear curve fitting; simulating, by the one or more hardware processors, current operating condition of the mining and mineral processing operations corresponding to the set of variables based on at least one of: the generated ML models, the individualized physics based models of the KPIs, the set of hybrid models and the plurality of process parameters, wherein the simulated current operating condition provides current values for KPIs and the plurality of process parameters of interest; and hierarchically optimizing, by the one or more hardware processors, the KPIs of interest of the mining and mineral processing operations to update the current operating conditions of a subset of variables among the set of variables of the mining and mineral processing operations, wherein the KPIs of interest are from at least one of the mining operations, a comminution circuit, and a flotation and concentration circuit. The processor implemented method further comprising monitoring current operating condition of the set of variables in accordance with the processed data of the set of variables corresponding to the mining and mineral processing operations to detect failure of one or more sensor from the set of sensors or failure of a process equipment, wherein the failure and a reason for the failure is indicated to a system administrator.

In another aspect, there is provided a system for online monitoring and optimization of mining and mineral processing operations, the system comprising: a memory storing instructions; one or more communication interfaces; and one or more hardware processors coupled to the memory via the one or more communication interfaces, wherein the one or more hardware processors are configured by the instructions to: fetch from a plurality of data sources data for a set of variables corresponding to a set of sensors associated with the mining and mineral processing operations; pre-process the fetched data corresponding to the set of variables by discarding outliers, performing imputation for adding artificial values at missing positions, organizing data collected at different frequencies to one common frequency, identifying and selecting data based on steady state operation of a process or a sub-process associated with the mining and mineral processing operations; determine standard operating condition for the mining and mineral processing operations using the pre-processed data corresponding to the set of variables; segregate each variable among the set of variables into one of drilling-blasting operations, hauling operations, crushing-grinding circuit, and flotation- and concentration circuit, wherein segregation is performed in accordance with a master tag list; generate a set of models based on the segregated set of variables and preprocessed data, wherein the set of models is generated for a set of Key Performance Indicators (KPIs) of interest and a plurality of process parameters of interest associated with the mining and mineral processing operations, wherein the generated set of models comprise a set of Machine learning (ML) models, a set of individualized physics based models or hybrid models wherein the set of individualized physics based models or hybrid models are generated for the plurality of process parameters based on known physics based models by determining model parameters using non-linear curve fitting; simulate current operating condition of the mining and mineral processing operations corresponding to the set of variables based on at least one of: the generated ML models, the individualized physics based models or hybrid models of the KPIs and the plurality of process parameters, wherein the simulated current operating condition provides current values for KPIs and the plurality of process parameters of interest; and hierarchically optimize the KPIs of interest of the mining and mineral processing operations to update the current operating conditions of a subset of variables among the set of variables of the mining and mineral processing operations, wherein the KPIs of interest are from at least one of the mining operations, a comminution circuit, and a flotation and concentration circuit. The system is further configured to monitor current operating condition of the set of variables in accordance with the processed data of the set of variables corresponding to the mining and mineral processing operations to detect failure of one or more sensor from the set of sensors or failure of a process equipment, wherein the failure and a reason for the failure is indicated to a system administrator.

In yet another aspect, there are provided one or more non-transitory machine readable information storage mediums comprising one or more instructions which when executed by one or more hardware processors causes a method for online monitoring and optimization of mining and mineral processing operations The instructions cause fetching from a plurality of data sources data for a set of variables corresponding to a set of sensors associated with the mining and mineral processing operations; pre-processing the fetched data corresponding to the set of variables by discarding outliers, performing imputation for adding artificial values at missing positions, organizing data collected at different frequencies to one common frequency, identifying and selecting data based on steady state operation of a process or a sub-process associated with the mining and mineral processing operations; determining, by one or more hardware processors, standard operating condition for the mining and mineral processing operations using the pre-processed data corresponding to the set of variables; segregating, by one or more hardware processors, each variable among the set of variables into one of the drilling and blasting operations, hauling operations, a comminution circuit, and the flotation and concentration circuit, wherein segregation is performed in accordance with a master tag list; generating, by one or more hardware processors, a set of models based on the segregated set of variables and preprocessed data, wherein the set of models is generated for a set of Key Performance Indicators (KPIs) of interest and a plurality of process parameters of interest associated with the mining and mineral processing operations, wherein the generated set of models comprise a set of Machine learning (ML) models or a set of individualized physics based models or hybrid models, wherein the set of individualized physics based models or hybrid models are generated for the plurality of process parameters based on known physics based models by determining model parameters using non-linear curve fitting; simulating, by one or more hardware processors, current operating condition of the mining and mineral processing operations corresponding to the set of variables based on at least one of: the generated ML models and the individualized physics based models of the KPIs or the plurality of process parameters, wherein the simulated current operating condition provides current values for KPIs and the plurality of process parameters of interest; and hierarchically optimizing, by one or more hardware processors, the KPIs of interest of the mining and mineral processing operations to update the current operating conditions of a subset of variables among the set of variables of the mining and mineral processing operations, wherein the KPIs of interest are from at least one of the mining operations, the comminution circuit, and the flotation and concentration circuit. The processor implemented method further comprising monitoring current operating condition of the set of variables in accordance with the processed data of the set of variables corresponding to the mining and mineral processing operations to detect failure of one or more sensor from the set of sensors or failure of a process equipment, wherein the failure and a reason for the failure is indicated to a system administrator.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1A:
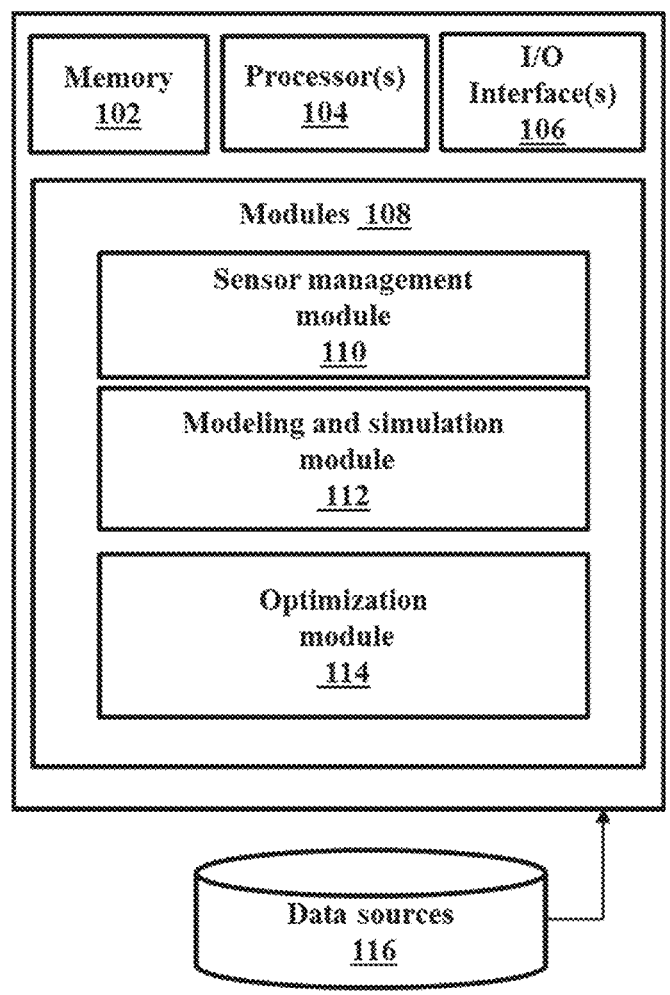
FIG. 1A and FIG. 1B illustrate an exemplary block diagram of a system for online monitoring and optimization of mining and mineral processing operations, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Mining and mineral processing involves a series of operations to recover a desired mineral with a reasonably high grade. Broadly the operations include mining operations, a comminution circuit, and a flotation and concentration circuit, with each operation involving a plurality of sub operations or processes to recover the mineral with desired quality. Existing digital monitoring tools provide monitoring and analysis of these operations to optimize performance. However, the existing tools are specific to one or other individual operations from the mining operations, the comminution circuit and the concentrator and flotation circuit. The individuality introduces limitations when to be used as an integrated end to end monitoring solution for the entire mine to mineral processing operations. Major challenges in end to end mining and mineral processing operations include (1) poor lumps recovery and dilution control due to inefficient blasting practice, (2) neglecting the effect of decision or manipulated variables of upstream unit operations on key performance indicators of downstream unit operations (KPIs) while deciding their set points, (3) using immutable look-up tables to update the set points of the decision variables, and (4) rule based control of the mining and mineral processing operations due to inability to formally relate the key performance indicators in-terms of decision and disturbance variables.

Embodiments of the present disclosure provide systems and methods for online monitoring and optimization of mining and mineral processing operations. The system disclosed provides an integrated approach utilizing short-term planning data and models of fragmentation, crushing, screening, grinding and flotation to arrive at optimized blast design. The method and system disclosed minimizes cost of production, maximizes yield of desired particle size to be used in downstream units to arrive at optimized grade and recovery of desired mineral. Further, the system provides simulation models to predict the key outputs of individual unit operations such as average particle size in the cyclone overflow, grade and recovery of metals in by utilizing both historical data and online data from a plurality of data sources associated with the mining and mineral processing operations.

Referring now to the drawings, and more particularly to FIGS. 1 through 10, where similar reference characters denote corresponding features consistently throughout the figures, there are shown preferred embodiments and these embodiments are described in the context of the following exemplary system and/or method.

Figure 1B:
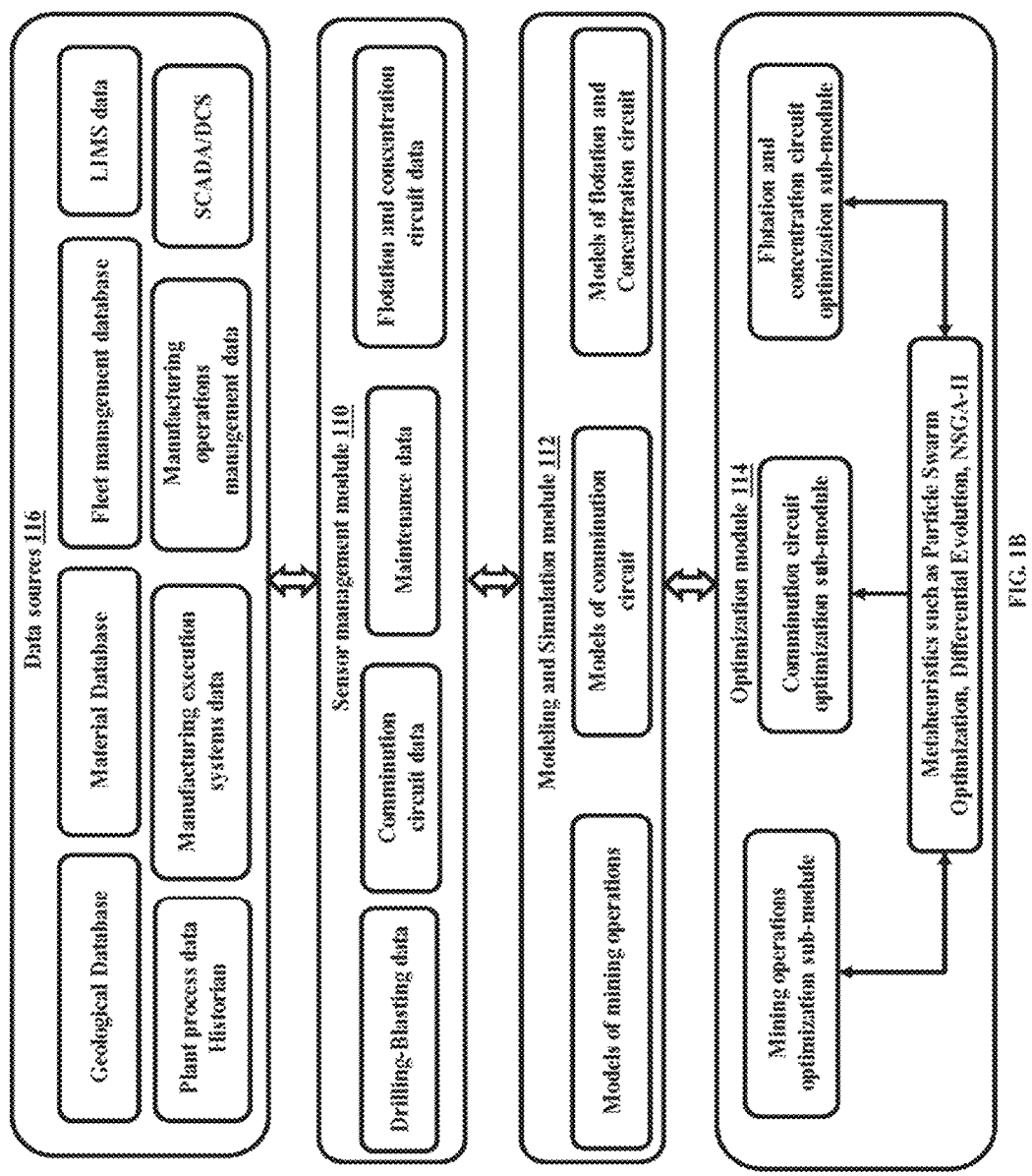

FIG. 1A and FIG. 1B illustrate an exemplary block diagram of a system 100 for online monitoring and optimization of mining and mineral processing operations, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a plurality of modules 108 can be stored in the memory 102, wherein the modules 108 may comprise a sensor management module 110, a modelling and simulation module 112, and an optimization module 114, which are configured to monitor and optimize the mine to mill processing operations when executed by the one or more processors 104. The memory 102 may further comprise information pertaining to input(s)/output(s) of each step performed by the sensor management module 110, the modelling and simulation module 112 and the optimization module 114 of the system 100 and methods of the present disclosure. The system 100, through the I/O interface 106 may be coupled to external plurality of data sources 116, providing data required for online monitoring and optimization the mining and mineral processing operations.

Figure 2A:
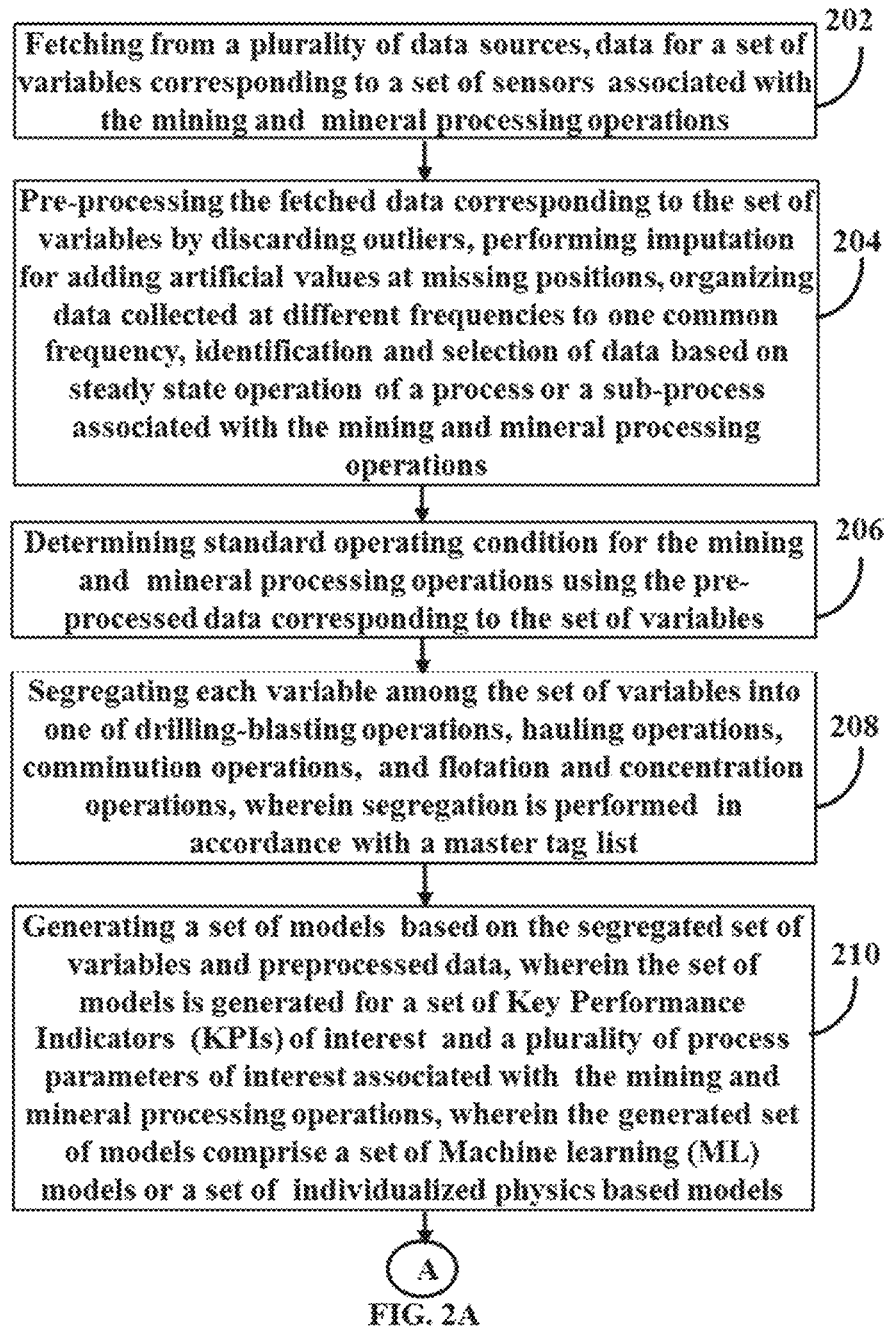
FIG. 2A and FIG. 2B illustrate an exemplary flow diagram of a method, implemented by the system of FIG. 1A and FIG. 1B, for online monitoring and optimization of the mining and mineral processing operations, in accordance with an embodiment of the present disclosure.
Figure 2B:
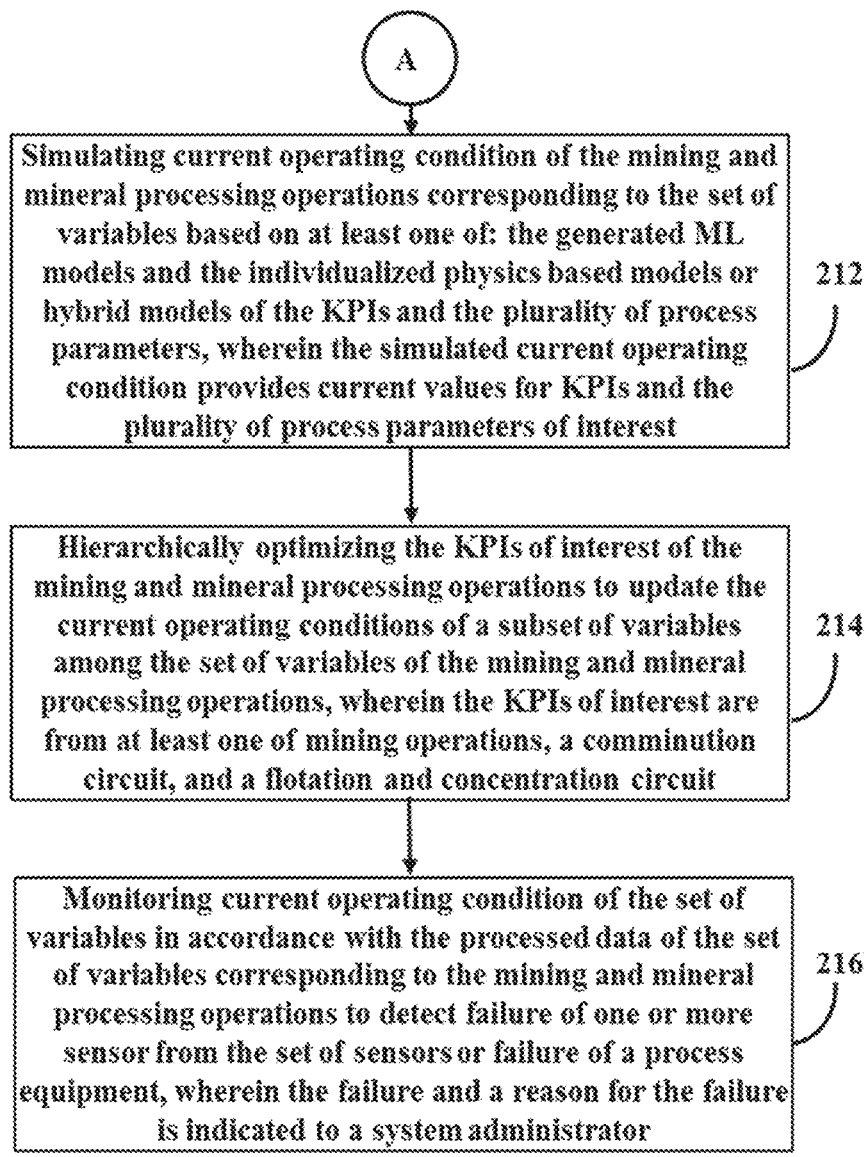

FIG. 1B depicts example functional blocks, modules, or components and functional process flow of the sensor management module 110, the modeling and simulation module 112, an optimization module 114 and connectors to fetch data from relevant sources 116 that are installed at a mining and mineral operations' site. FIG. 1B is explained in conjunction with steps of flow diagram depicted in FIG. 2A and FIG. 2B. In an embodiment, FIG. 2A and FIG. 2B illustrate an exemplary flow diagram of a method, implemented by the system of FIG. 1A and FIG. 1B, for online monitoring and optimization of the mining and mineral processing operations, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104 in conjunction with various modules of the modules 110. The steps of the method of the present disclosure will now be explained with reference to the components of the system 100 as depicted in FIGS. 1A and 1B, and the steps of flow diagram as depicted in FIG. 2A and FIG. 2B. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 202 of the method, the sensor management module 110 is configured to communicate and fetch data for a set of variables, corresponding to a set of sensors from the plurality of data sources 116. This fetched data provides wide variety of data associated with and required for digital monitoring and optimization of the mining and mineral processing operations. The set of sensors are associated with and provide data for equipment and instrumentation installed for the mining operations (that includes hauling and stockpiling operation) required for mining operations or equipment and instrumentation installed for comminution circuits or the flotation and concentration circuits of mineral processing operations. The sensors are also associated with quality parameters of a plurality of streams of the plant comprising raw material, intermediate and final product. Further, the sensors also comprise data corresponding to source and quantity of different raw material processed and data corresponding to equipment breakdown and maintenance history, environmental and weather conditions, and rock and terrain properties.

The fetched data includes data of different nature such as geological, material, fleet management, LIMS (Laboratory information management system) data, manufacturing execution system data as well as drill and blast design data generated from the various tools such as Vulcan, Geovia, JKsimBlast, and the like. Further, the data sources 116 may include material database, fleet management database, plant process data historian, manufacturing execution systems data, manufacturing operations management data, ERP (Enterprise Resource Planning), DCS (Digital Control System) and the like.

Once the data is fetched, at step 204 of the method, the sensor management module 110 is configured to pre-process the fetched data corresponding to the set of variables by discarding outliers, and performing imputation for adding artificial values at missing positions, organizing data collected at different frequencies to one common frequency, identifying and selecting data based on steady state operation of the plant or a process or a sub-process associated with the mining and mineral processing operations. Various techniques such as Z-score and/or Box and Whisker analysis, Proximity based method may be used for removing outliers. Further, at step 206 of the method, the sensor management module 110 is configured to determine standard operating condition(s) for the mining and mineral processing operations of the plant using the pre-processed data corresponding to the set of variables. The incoming data from the various data sources 116 is already tagged with name and description of each variable. A master list of these tags providing description of each tag is stored in the sensor management module 116.

At step 208 of the method, the sensor management module 110 is configured to segregate and group variable among the set of variables in the data into different unit operation and equipment required for mining and mineral processing operations in accordance with the master tag list. Sections comprise (1) Drilling-blasting-hauling, (2) Comminution circuit and (3) Flotation and concentration circuit. Each of the variables is also tied down to the different units where these sensors reside. In addition to the various data sources, the system 100 utilizes soft-sensors developed using modeling and simulation module 112. The soft sensors are ML or physics based models that can provide real time prediction of important process parameters of the mining and mineral processing operations, which are either infrequently or not measured at all. Thus, soft sensors may be developed for the process parameters such as specific fracture energy, particle size distribution, slurry density of the intermediate stream, solids hold up in the grinding mills and the like. The sensor management module 110 is configured to also include the soft sensors. Further, the sensor management module 110 is configured to report sensor failures when any of online sensors or soft sensors consistently report values outside its operating region, thus prompting user or system administrator to take corrective action.

Further, at step 210 of the method, the modeling and simulation module 114 is configured to generate a set of models from the segregated data and the preprocessed data. The set of models is generated for a set of Key Performance Indicators (KPIs) of interest and a plurality of process parameters of interest such as particle size distribution in output of crusher and grinding mills, solids hold up in grinding mill, mineral grade in either tail or concentrate for rougher and scavenger flotation that associated with the mining and mineral processing operations. The generated set of models comprise a set of Machine learning (ML) models or a set of individualized physics based models or hybrid models. The individualized physics based models or hybrid models (alternatively referred as individualized physic based models) are generated for the plurality of process parameters based on known physics based models by determining model parameters using non-linear curve fitting. This individualization is provided by the system 100 disclosed as existing models parameters are not universal and require customization. The variables used from the sensor management module used to model KPIs of interest are related to the process of interest and can be manually selected by the user or automatically selected using feature selection techniques. ML techniques such as linear regression, random forest, support vector machines, neural networks and the like can be used to develop the ML models from the processed historical data taken from the sensor management module 110. The plurality of KPIs of interest for which the set of models are generated comprise one or a combination thereof cost of blasting operations, flyrock size and velocity, fragment size distribution, hauling cost, throughput to stockpile, shape of stockpile, screening efficiency, cost of comminution circuit operation, particle size distribution, comminution circuit throughput, grade and/or recovery of mineral of interest in output streams of the flotation and concentration circuit.

Further, at step 212 of the method, the modeling and simulation module 112 is configured to simulate current operating condition of the mining and mineral processing operations corresponding to the set of variables. The simulation is based on one of the generated ML models, the individualized physics based and hybrid models of the KPIs or the plurality of process parameters. The simulated current operating condition provides current values for KPIs and process parameters of interest. For example, simulations can also be performed on the developed models of the KPIs such as grade, recovery, power requirement in the grinding circuit to evaluate the plant performance with the current operating conditions, which is communicated in the form of recent data coming from the sensor management module 110.

Further, at step 214 of the method, the optimization module 114 is configured to hierarchically optimize the KPIs of interest by updating the current operating values of a subset of variables among the set of variables of the mining and mineral processing operations. The optimized KPIs of interest may be for the mining operations, the comminution circuit, and the flotation and concentration circuit. The optimization module 114 is configured to use information captured from the models developed in the modeling and simulation module along with the information captured from other sources to optimize the mining operation, comminution circuit performance and flotation and concentration circuit performance. For example, the mining operation optimization sub-module of the optimization module 114 improves the blasting operations with an aim to reduce the cost of explosives, reduce the flyrock formation, and the cost of downstream hauling and crushing-grinding operations, further explained in conjunction with FIG. 5. Further, the sub modules such as the comminution circuit optimization module and the flotation and concentration circuit optimization sub-module are described in conjunction with FIG. 6 and FIG. 7 respectively.

Furthermore, at step 216 of the method, the optimization module 114, in conjunction with (a) the sensor management module 110 providing present data corresponding to the set of variables corresponding to the set of sensors and (b) the modeling and simulation module 112 providing the ML models and/or the individualized physic models, is configured to monitor current operating condition of the set of variables in accordance with the processed data of the set of variables corresponding to the mining and mineral processing operations. The monitoring includes detecting failure of one or more sensors from the set of sensors or failure of a process equipment. Any detected failure and a reason for the failure is indicated to a system administrator for corrective action, reducing the chances of failure and any untoward effect on the mining and milling processing operations. The optimization of the KPIs of interest for the mining operation, the comminution circuit, or the flotation and concentration circuit comprises formulating and solving optimization problem which comprises objective functions and constraints expressed in terms of the KPIs of interest, that are modeled using ML models or individualized physics based models. The solution of the optimization problem provides a set of values of the subset of variables, which are changed dynamically during the mining and mineral processing operations. The solution of the optimization problem provides:

(1) Recommendation of charge plan including information of amount and type of explosives;

(2) Set points for a plurality of controllers located at different positions along comminution, and flotation and concentration circuit The system 100 provides a digital replica of entire chain of operations involved in mining and mineral processing namely drilling, blasting, hauling, crushing, screening, grinding, flotation, and thickening. The current running status of each of the units is updated using data received from disparate sources distributed across the plant. The current running status of a unit consists of the present measured value of the sensors employed in the field, soft sensors developed using simulation models developed using sensor data, lab measurements and other such measurements fetched from the updated plant databases. Data fetched from these sources is used to either tune or develop models for section-wise KPIs and overall KPIs as function of the several manipulated/decision variables and important disturbance variables. These models are utilized to find the set points of decision variables that result in the improvement in the KPIs. The estimated decision variables are communicated to the lower level controllers as set points (in case of automatic control) or to hand-held devices with the operators (in case of manual control) so that these can be implemented in the field. Thus the system 100 provides end to end solution to improve existing mining and mineral processing operations.

Figure 3:
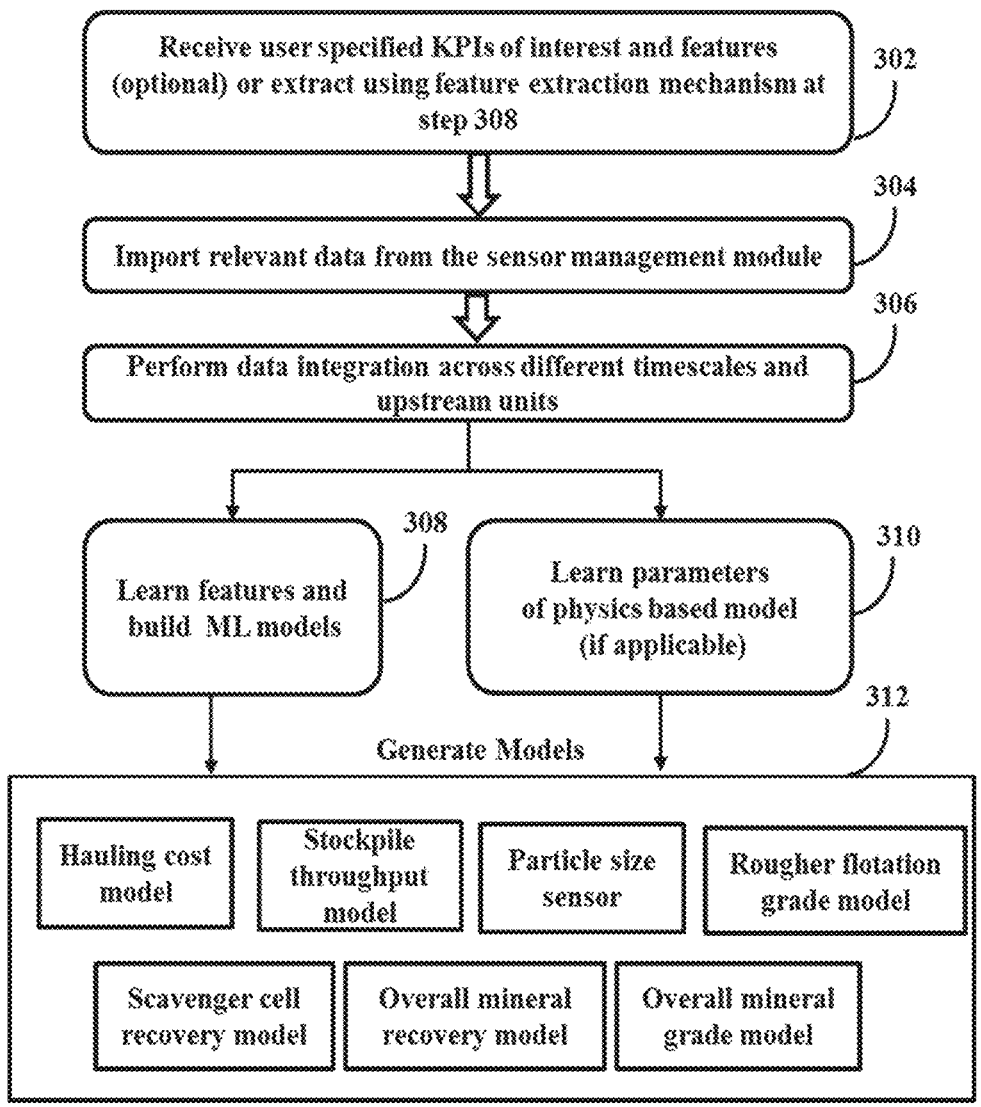
FIG. 3 illustrates an example flow diagram of a method, implemented by modeling and simulation module of the system depicted in FIG. 1A and FIG. 1B, for generating models for Key Performance Indicators (KPIs) of the mining and mineral processing operations, in accordance with an embodiment of the present disclosure.

FIG. 3 illustrates an example flow diagram of a method, implemented by the modeling and simulation module 112 of the system depicted in FIG. 1A and FIG. 1B for generating models, for example, Key Performance Indicators (KPIs) of the mining and mineral processing operations, in accordance with an embodiment of the present disclosure and to simulate what-if scenarios, to evaluate the effect of decision variables and measured disturbances on the plant performance and also to identify scope of improvement in plant operations. At step 302 of the method, the modeling and simulation module 112 is configured to receive user specified KPIs of interest and set of variables needed to be used to build model the KPIs of interest. Further, at step 304 of the method, the modeling and simulation module 112 is configured to import relevant data from the sensor management module 110 and at step 306 perform data integration across different timescales and upstream units in case the variables are measured at different frequencies and obtained from different databases. At step 308 of the method, the modeling and simulation module 112 is configured to learn features to build ML models or at step 310, learn parameters of physics based model (if applicable). Optionally, at step 308 important variables required to build the models can be determined using unsupervised feature selection techniques such as Principal Component Analysis (PCA), association rule mining or using model based feature selection techniques such as LASSO, Random Forest (RF), and the like. For e.g., mineral grade in rougher concentrate can be modeled as function of large set of variables that are part of the upstream equipment such as Semi-Autogenous Mill (SAG), Ball-mill and other such high energy mills, cyclone cluster, and rougher flotation column itself along with raw material properties. The automatic feature selection helps to find only the relevant variables that affect the mineral grade in rougher concentrate and thus assists in decision making.

At step 312 of the method, the modeling and simulation module 112 is configured to generate and maintain a library of set of models for the KPIs of interest, for example, herein hauling cost model, particle size, rougher flotation grade model, scavenger cell mineral recovery model, overall mineral recovery model, overall mineral grade model and so on. Either physics based model if available or ML techniques such as support vector machines, random forest, gradient boosted machines, neural networks are used to build the model.

Figure 4A:
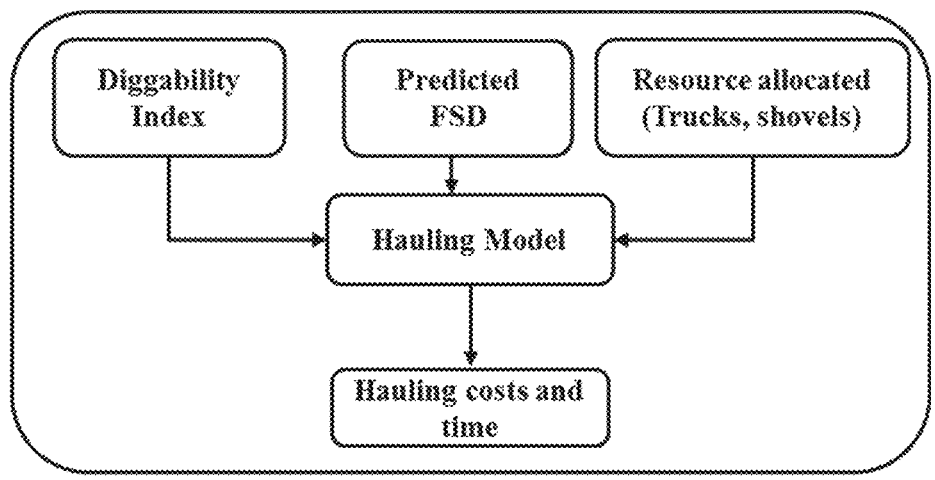
FIG. 4A, FIG. 4B and FIG. 4C illustrate data for different sensors received from a user or from a sensor management module of the system of FIGS. 1A and 1B and processed by the generated example models to compute values of a few KPIs of interest, in accordance with an embodiment of the present disclosure.
Figure 4B:
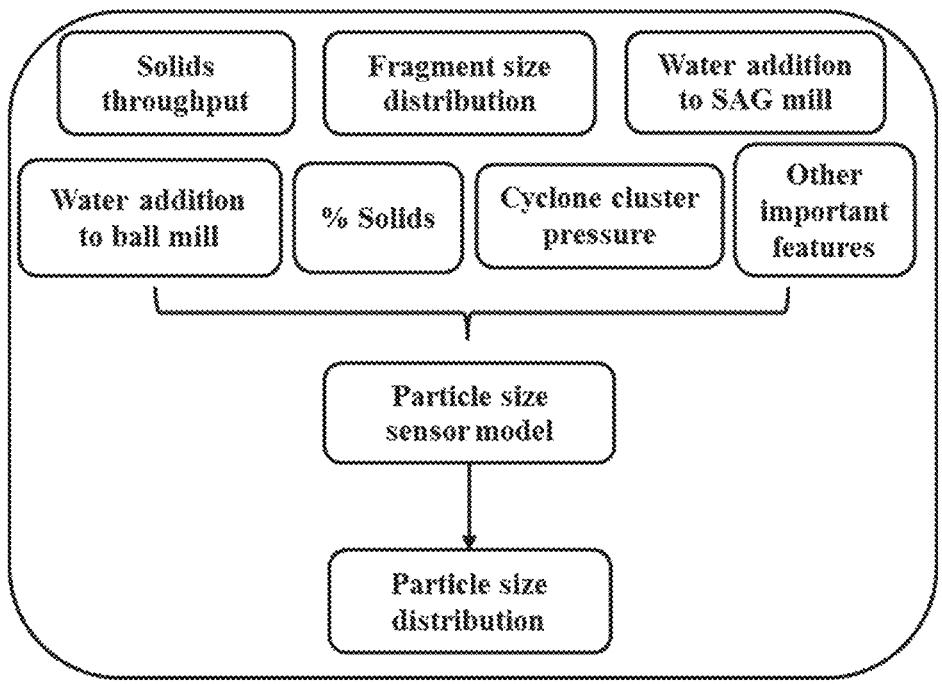
Figure 4C:
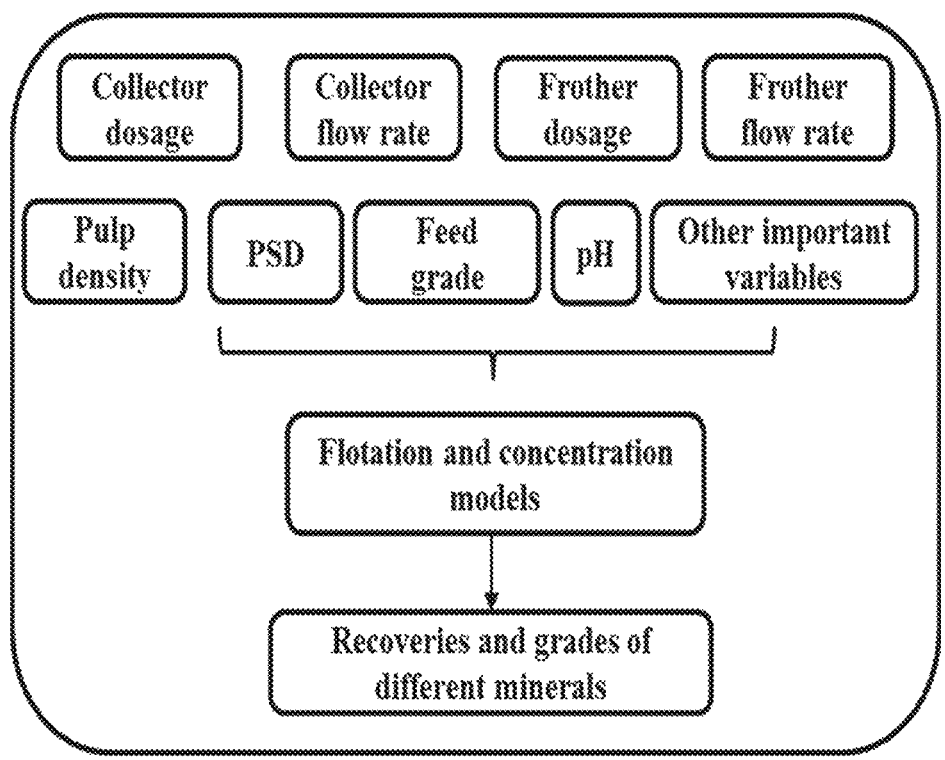

FIG. 4A, FIG. 4B and FIG. 4C illustrate data from the sensors received from the user or from the sensor management module 110 of the system of FIGS. 1A and 1B and processed by the generated example models to compute values of a few KPIs of interest, in accordance with an embodiment of the present disclosure. FIG. 4A depicts receiving input data such as Diggability Index, predicted Fragment Size Distribution (FSD), resource allocated (for example, trucks, shovels) that are processed by hauling model to provide current values of the KPI of interest such as hauling costs and time. FIG. 4B depicts receiving input data such as solids throughput, fragment size distribution, water addition to SAG mill, water addition to ball mill, pulp density, cyclone cluster pressure and other important features by the particle size sensor model to provide current values of KPI of interest, for example herein particle size distribution. FIG. 4C depicts receiving input data of process parameters such as collector dosage, collector flow rate, frother dosage, frother flow rate, percentage solids, Particle Size Distribution (PSD), feed grade, pH and other important features by the flotation and concentration models to provide current values of recoveries and grades of different minerals.

Figure 5:
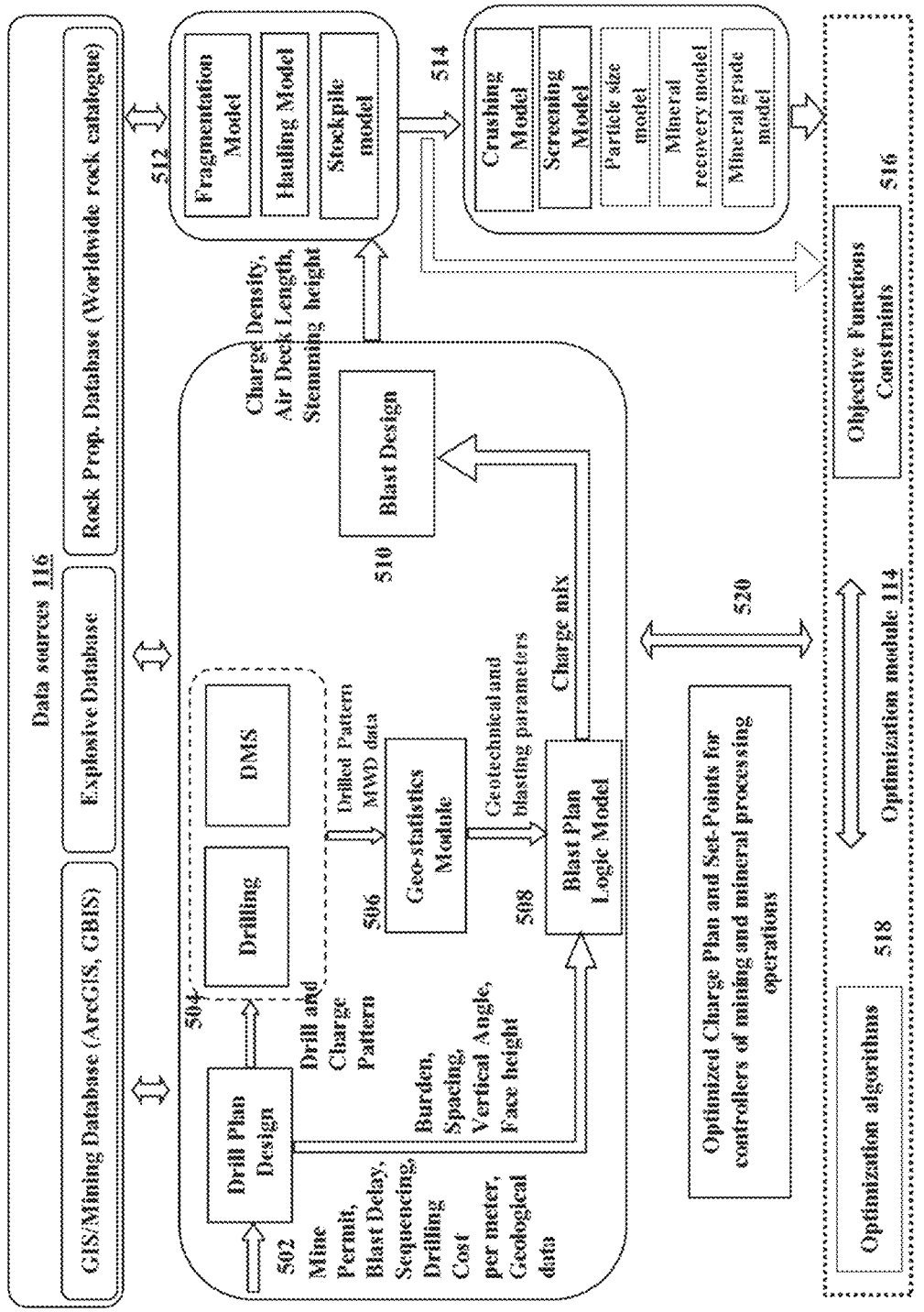
FIG. 5 illustrates a method for hierarchal and phase-wise optimization of KPIs of mining and mineral processing operations depicting interaction between a plurality of data sources corresponding to plant database, blast and drill design software, trained Machine Learning (ML) models and physics based and hybrid models build using modeling and simulation module, and optimization module that recursively updates charge plan and decision variables of the mineral processing operations in accordance with an embodiment of the present disclosure.

FIG. 5 illustrates a method for hierarchal and phase-wise optimization of KPIs of mining and mineral processing operations depicting interaction between a plurality of data sources corresponding to plant database, blast and drill design software, trained Machine Learning (ML) models, physics based and hybrid models build using modeling and simulation module, and optimization module that recursively updates charge plan and decision variables of the mineral processing operations in accordance with an embodiment of the present disclosure.

Optimization of mining and mineral processing operations in accordance with the phase-wise and hierarchical procedure comprises steps of creating drilling pattern and a preliminary charge pattern based on short term mining plan using third party software such as Vulcan and Geovia. Further, the step comprises performing production drilling operations to collect Monitoring While Drilling (MWD) data through drill monitoring system such as Leica Tritonics; where MWD data comprise information such as drill rod revolution rate, rotary torque, pull down force, drilling rate, angular velocity, penetration rate. Further, using the MWD data to estimate the geotechnical parameters such as specific fracture energy and blasting parameters such as air deck length, stemming height for each hole that will be blasted. Also designing charge plan that comprises information of charge mix for each of the hole based on the estimated geotechnical parameters and drilling pattern. Furthermore, the steps include estimating fragment size distribution (FSD) using models that make use of calculated blasting parameters and charge plan. The estimated FSD along with relevant process parameters are used to simulate the expected KPIs of mining operations such as hauling costs, stockpile throughput, flyrock size, velocity and range and cost of explosives. At this stage, the charge plan may be further refined so as to improve a customized optimization problem which is expressed as some functional form of the KPIs of the mining operations. The above calculations of estimated stockpile throughput, fragment size distribution together with the relevant process parameters can be used to estimate KPIs of mineral processing operations such as specific energy consumption, screening efficiency, particle size distribution at important points during comminution circuit along with recovery and grade of the mineral of interest in flotation and concentration circuit using either ML or physics based models. The mineral processing operations can thus be optimized for the given charge plan by changing important decision variables that dictate the mineral processing operations. Furthermore, the optimization step comprises recursively perform either all or some of the above steps to arrive at optimized charge plan and set points of process parameters of mining and mineral processing operations that globally minimizes the customized objective function.

The steps above are further explained in conjunction with the example in FIG. 5. As depicted in FIG. 5, the user is directed to design drilling pattern and charge pattern using short-term mining plan data, rock properties, and geological data coming from the databases such as GBIS, ArcGIS. The short term mining plan (502) is provided from data source 116. Production drilling operation (504) is performed in the field and drill monitoring system (DMS) is used to record MWD, monitoring while drilling data. DMS is the existing drill monitoring system (sensors+third party software) so the sensor data is used by the system 100. Thus, data from third party sources can also be part of data source 116. Geostatistics module (506) comprises trained ML models that estimate blasting and geotechnical parameters one such being specific fracture energy. This can be devised by modeling and simulation module 112. The trained models of geotechnical parameters are examples of soft sensors. Thus soft sensor developed using modeling and simulation module 112 becomes part of sensor management module 110. Blast plan logic model is part of modeling and simulation module 112. Blast plan logic model provides recommendations for charge pattern based on estimated geotechnical and blasting parameters. Further, based on these recommendations more detailed charge plan and blasting parameters, Blast design (510) is to be determined on a blast design software such as Shotplus and JKSimblast. The blast design is to be used as an input to perform simulations on various models (512) of the mining operations. The various models (512), comprise models that are developed using modeling and simulation module 112. At this stage, the charge plan can be iteratively modified to minimize objective function formulated using performance measures of mining operations. To optimize both mining and mineral processing operations, models pertaining to comminution and flotation and concentration circuit operations (514) are also used. Optimization algorithms comprising mostly metaheuristics (518) and objective functions (516) formulated by predictions of the models listed in 512 and 514 are part of optimization module 114. Solution of the optimization problem obtained by minimizing or maximizing the formulated objective function provides charge plan and set points of important decision variables of the mining and mineral processing operations.

An example process of the system 100 for optimization of KPIs of the mining and mineral processing operations is further detailed below:

At step 502, drill and blast design software such as Vulcan or Geovia is used to design drill pattern and a preliminary charge plan. At step 504, monitoring while drilling, MWD data, is used to compute geotechnical properties such as specific fracture energy (SFE) and blasting parameters. The geo-statistical module developed (506) can apply interpolation techniques such as nearest neighbor method or Kriging method on the MWD data to estimate geotechnical properties and blasting parameters. At step 508, the geotechnical and blasting properties along with the proposed drilling pattern are used in the blast plan logic model to estimate the charge pattern rules. At step 510, the drilling pattern, corresponding charge pattern rules and blast parameters are imported to blast design software such as SHOTplus or Geovia to create charge plan.

The above steps culminate the stage of blast and drill pattern design along with estimation of blasting parameters to be used for the mining operations such as hauling, stockpile throughput. At step 512, Fragmentation models such as Kuz-Ram model predict the fragment size distribution and work index of the fragments formed after blasting along with parameters important for flyrock formation such as velocity. Hauling model utilizes a similarity search approach to predict cost of hauling operations based on historical data of hauling costs and predicted fragment size distribution, while stockpile model is used to predict the shape and throughput to the stockpile. At this stage, one can manipulate the charge plan using optimization module 114 to optimize KPIs related to mining operations alone such as lumps-to-fines ratio, amount of each explosive required, hauling costs and fragment size.

At step 514, KPIs of interest of mineral processing operations namely comminution and flotation and concentration are estimated. Crusher model can predict the power requirements and product size distribution based on estimated fragment size distribution. Models proposed in the literature such as Whiten crusher model and Csoke model or else machine learning model developed using the data from data sources 116 can be used. The screening model further predicts the size distribution of the lumps and fines as well as the efficiency of screening operations. Models developed in the literature previously such as Karra's model, and Hatch and Mular model can be calibrated and used in the application. Grinding model will predict power requirements to break down the screened ore or the bigger particles collected in the cyclone underflow to size required for further processing in the concentrator, as well as the final product particle size distribution. Mineral recovery and grade models predict the recoveries and grades respectively of the mineral of interest in concentrates or tails in the different flotation equipment used in the mineral processing operations.

At step 516, based on the entire chain of calculations, user customized or default optimization problem expressed in terms of KPIs of mining and mineral processing operations is formulated.

At step 518, the formulated optimization problem is solved using optimization algorithms which are mostly metaheuristics such as particle swarm optimization, genetic algorithm, Tabu-search, simulated annealing, and the like. The optimization system runs in an iterative mode to determine charge plan along with the set points of important manipulated variables of the mining and mineral processing operations such as process water addition to the grinding mills, rpm of the ball mill, cyclone cluster pressure, pH of the flotation equipment, collector and frother addition rate to the flotation equipment.

Figure 6:
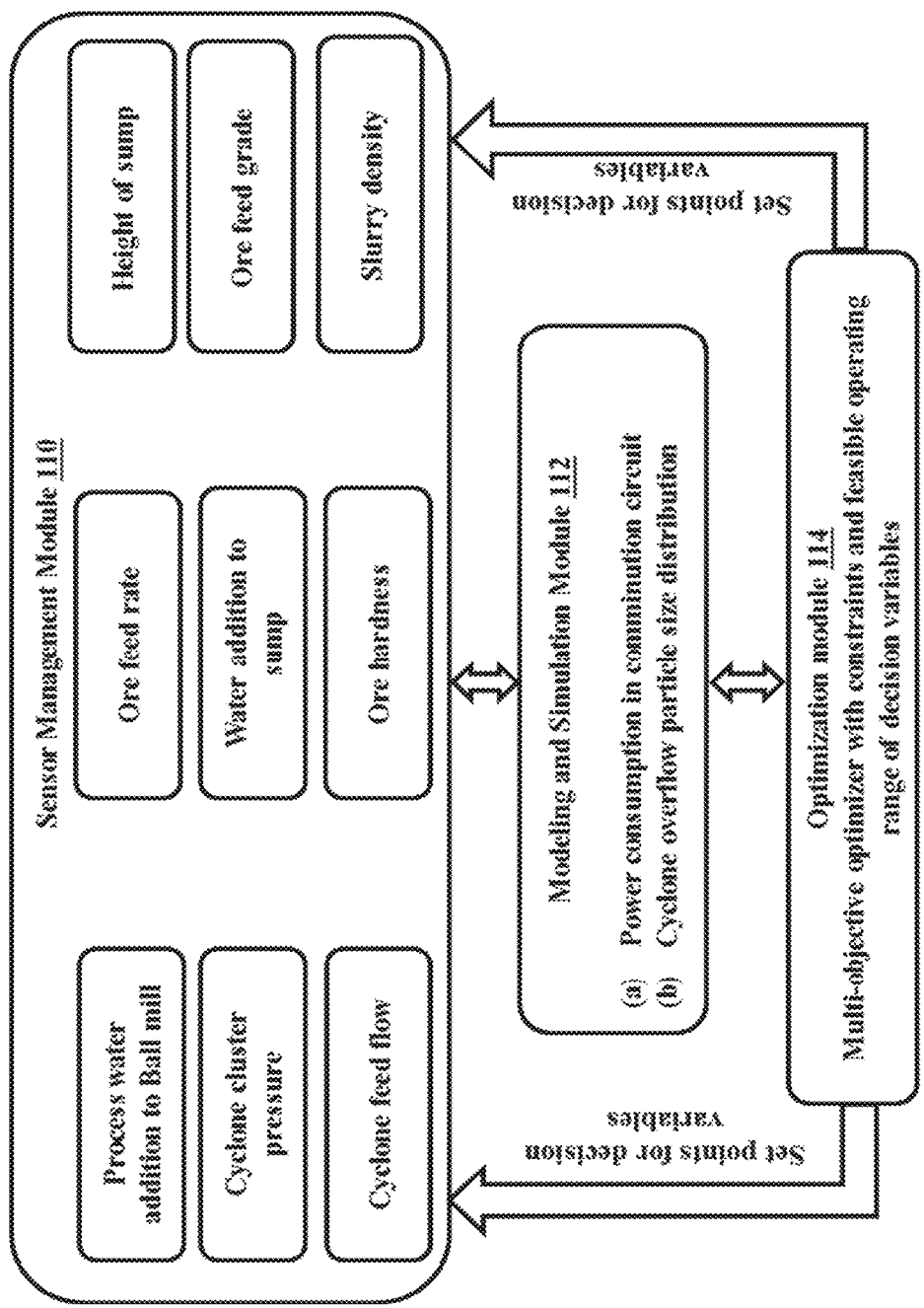
FIG. 6 illustrates interactions between the modules of the system of FIGS. 1A and 1B as required for online monitoring and optimization of few example KPIs of a comminution circuit of the mining and mineral processing operations, in accordance with an embodiment of the present disclosure.
Figure 7:
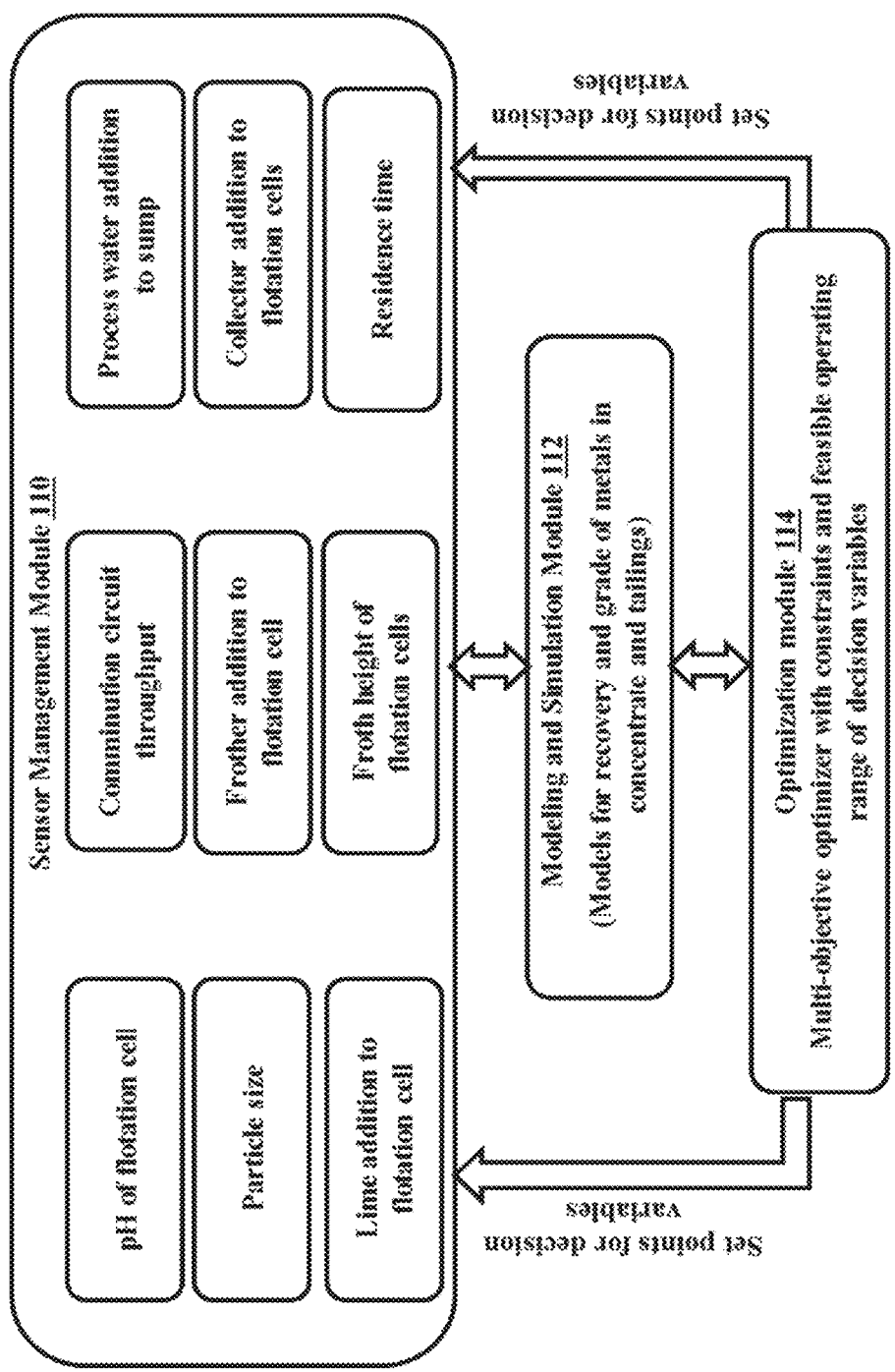
FIG. 7 illustrates interactions between the modules of the system of FIGS. 1A and 1B as required for online monitoring and optimization of few example KPIs of a flotation and concentration circuit of the mining and mineral processing operations in accordance with an embodiment of the present disclosure.

At step 520, charge plan and the set points of manipulated variables estimated at the previous step are sent to DCS/SCADA through sensor management module and/or hand held devices used by the operators to execute the recommendations in the field. The optimization system will work online when the different modules of the proposed system are seamlessly integrated with the different data sources. It needs to be noted further that only a part of the mining and mineral processing operations can also be optimized as shown in FIG. 6 and FIG. 7.

Described in detail here is a blast plan logic model (508) that generates the blasting plan:

The drilling machine data such as such as the feed actuator force, rotary actuator force can be used to calculate Specific Fracture Energy (SFE). A mathematical model is developed to ascertain the SFE or Work Done per Unit Volume Excavated of the rock layers or Strata. The formula of the SFE is as follows:

$$SFE = (pi/30) \cdot (T \cdot N/A \cdot R) + (F/A) \tag{1}$$

Mathematical Derivation for defining the Program Logic:

SFE is defined as work done per unit volume excavated. So, it can be written as:

$$e = (E/v) \text{Joules/m3 or Newton/m2} \tag{2}$$

Where, E=Energy transmitted from Drill to rock
V=Volume of fragmented rock (as mentioned in the basic parameter list)

$$\text{Further, } E = P \cdot t \text{ and } V = A \cdot R \cdot t \tag{3}$$

Where, P=Power transmitted to the rock
t=Time
A=Cross sectional area of the hole as described above in the parameters list
R=Penetration Rate as described above in the parameters list $$\text{This provides, } e = P \cdot t / A \cdot R \cdot t = P/A \cdot R \tag{4}$$

In case of rotary drilling, both the feed and the rotary actuators feed the power. Assuming that all of the actuator power is transmitted to the rock and results in fragmentation. Thus, it can be stated that $$P_{otarydrilling} = P_{otaryactuator} + P_{feedactuator} \quad (5)$$

Where, $$P_{otaryactuator} = T \cdot w = (pi/30) \cdot T \cdot N \quad (6)$$

Where,
T=Rotary Actuator Torque (Nm)
w=Angular Velocity as described above in the parameters list (radians/second)
N=Revolutions per minute of the Drill bit=(30/pi)·w, and, $$P_{feedactuator} = F \cdot R \quad (7)$$

Where,
F=Feed Force or Pull Down Force (Newton) applied by the motor on the drill rod.

$$\text{This implies, SFE for rotarydrilling} = P_{otarydrilling}/A \cdot R \quad (8)$$

=(Protaryactuator+Pfeedactuator)/A·R
={(pi/30)·T·N+F·R}/A·R
or,
SFE=(pi/30)·(T·N/A·R)+F/A Based on the SFE calculation, the rock type and rock properties can be analyzed elaborately.

Blasting, Charging Pattern Design based on SFE:

Based on the calculation of SFE as a function of depth, the charging pattern in each blast hole can be defined and designed. The basic charging pattern of a blast hole consists of two major components: 1. Charging of explosives, and 2. Stemming/Air Gaps.

The system may even be designed so that the explosives can be charged with different classes of industrial explosives (based on VOD, Velocity of Detonation) at different depths and for different rock properties. Intermediate stemming/air gaps can be used for very loose or fragile rock mass, along the hole depth, where the SFE is very low.

FIG. 6 illustrates interactions between the modules of the system 100 of FIG. 1A and FIG. 1B as required for online monitoring and optimization of few example KPIs of a comminution circuit, in accordance with an embodiment of the present disclosure.

Many optimization opportunities are available in the operation of a comminution circuit such as reducing power consumption, obtaining favorable particle size distribution in the cyclone overflow and increase the throughput of the comminution circuit.

FIG. 6 depicts a framework for online optimization of comminution circuit KPIs. The trained machine learning models and/or physics based and hybrid models of the KPIs developed in the modeling and simulation module interact with the optimization module and the solution comprising set-points of decision/manipulated variables is estimated that can be sent to lower level controllers or to operators. In optimization module, some of the predictive models are integrated in the form of objective functions and constraints depending on the user customized optimization problem. For example, an optimization problem to improve particle size distribution, say to increase the weight fraction of fines and medium sized particles while decreasing the proportion of bigger sized particles without affecting the comminution circuit throughput requires models of the weight fraction of the three different particle sizes along with a model of throughput of comminution circuit as function of decision/manipulated parameters such as water addition, rotation speed of ball mill, cyclone cluster pressure to specify a few. The models of the particle sizes can be used as objective functions, while the model of the throughput of the comminution circuit can be placed as constraint. Moreover, the feasible operating region of each decision variables/manipulated variable can be fetched from the sensor management module 110 or can be user defined. The optimization problem can be solved by multi-objective optimization techniques such as non-dominated sorting genetic algorithm (NSGA-II), multi-objective particle swarm optimization (MO-PSO), Strength Pareto Evolutionary Algorithm 2 (SPEA-2) or by converting multi-objective optimization problem into a single objective one by weighted sum approach.

Either online or historical data corresponding to the variables used for building models such as process water, feed rate to SAG mill, ore grade, cyclone cluster pressure stored in sensor management module 110 is used to train ML models of specific power consumption in comminution circuit, particle size distribution in cyclone overflow using Modeling and Simulation module 112. The models are used to frame a user customized optimization problem and is solved for in optimization module 114. The solution obtained as values of decision variables is pushed to sensor management module and through there to DCS/SCADA or to plant operators to be used as set points by lower level controllers.

FIG. 7 illustrates interactions between modules of the system of FIG. 1A and FIG. 1B as required for online monitoring and optimization of few example KPIs of the flotation and concentration circuit of the mining and mineral processing operations in accordance with an embodiment of the present disclosure. Improving recovery and grade are important KPIs of mineral processing plant. Modeling and simulation 112 is used to build the models of these important KPIs in terms of key decision/manipulated variables and disturbance variables such as feed grade, throughput of the plant, pulp density using the relevant data acquired from sensor management module. Mineral concentration circuit optimization sub-module works in the similar manner as comminution circuit optimization sub-module of FIG. 6. The user customized optimization problem expressed in terms of the modeled KPIs of flotation and concentration circuit is solved. For e.g., improving both recovery and grade of key mineral can be posed as objective functions while maintaining recovery of the secondary mineral can be posed as constraint. Such an optimization problem can be solved using non-dominated sorting genetic algorithm-II (NSGA II) that results in recommendation of optimal set points of key decision/manipulated variables. FIG. 7 depicts a one such framework to estimate the set points of key decision/manipulated variables of the concentration circuit and comminution circuit so as to maximize the grade and recoveries.

Either online or historical data corresponding to the variables used for building models such as pH of flotation cell, solids throughputs through comminution circuit, collector flow rate stored in sensor management module 110 is used to train ML models for mineral grade and recovery in Modeling and Simulation module 112. The models are used to frame a user customized optimization problem and is solved for in optimization module 114. The solution obtained as values of decision variables is pushed to sensor management module and through there to DCS/SCADA or to plant operators to be used as set points by lower level controllers.

It is to be understood that FIG. 6 and FIG. 7 described above provide some examples KPIs that can be monitored and optimized using the disclosed method and system 100. Any additional KPIs of interest can also be added.

Figure 8A:
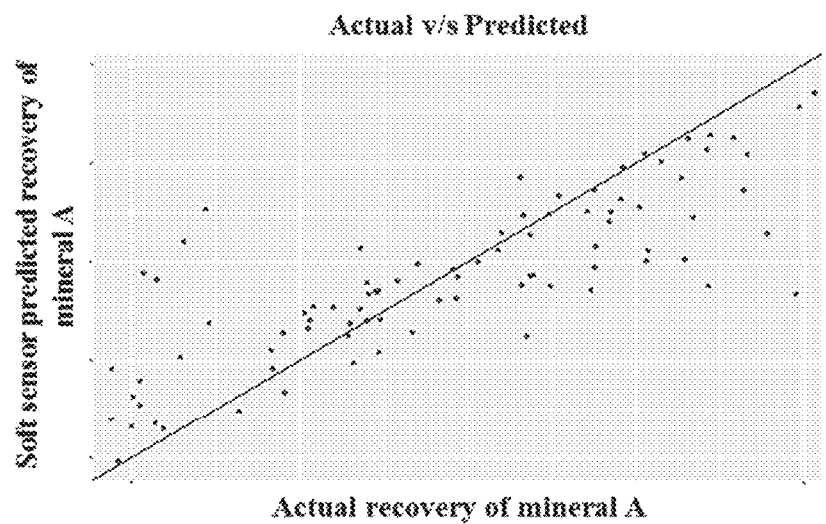
FIG. 8A and FIG. 8B illustrate performance of Machine Learning (ML) based predictive models of example KPIs with respect to real data of mining and mineral processing operations, in accordance with an embodiment of the present disclosure.
Figure 8B:
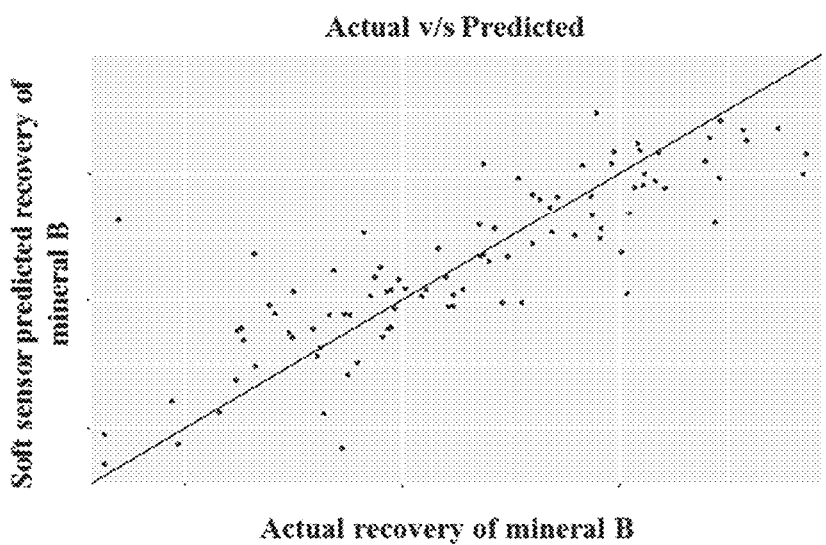

FIG. 8A and FIG. 8B illustrate performance of Machine Learning (ML) based predictive models of example KPIs with respect to real data of mining and mineral processing operations, in accordance with an embodiment of the present disclosure. FIGS. 8A and 8B compare the predictions made by ML models of recovery of mineral A and B built using modeling and simulation module 112 with the actual plant data. Reasonable level of accuracy is obtained by these models considering only decision and disturbance variables as features.

Figure 9A:
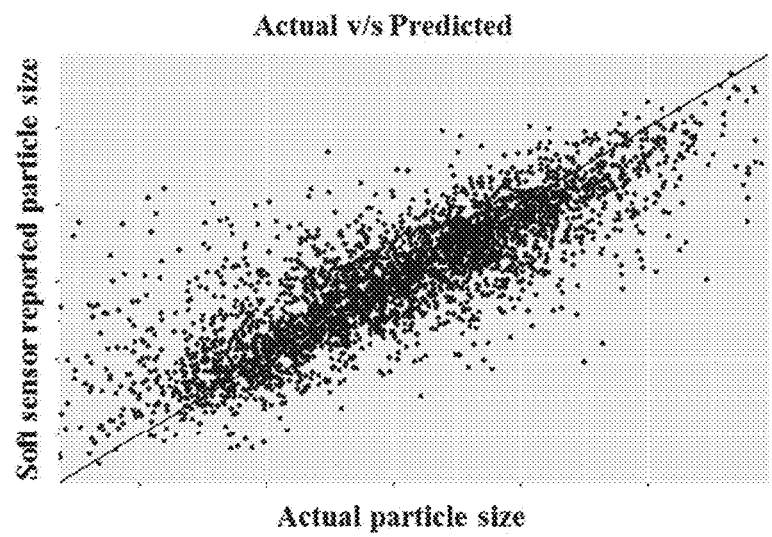
FIG. 9A and FIG. 9B illustrate predictive performance of a soft sensor of a particle size and metal grade, in accordance with an embodiment of the present disclosure.
Figure 9B:
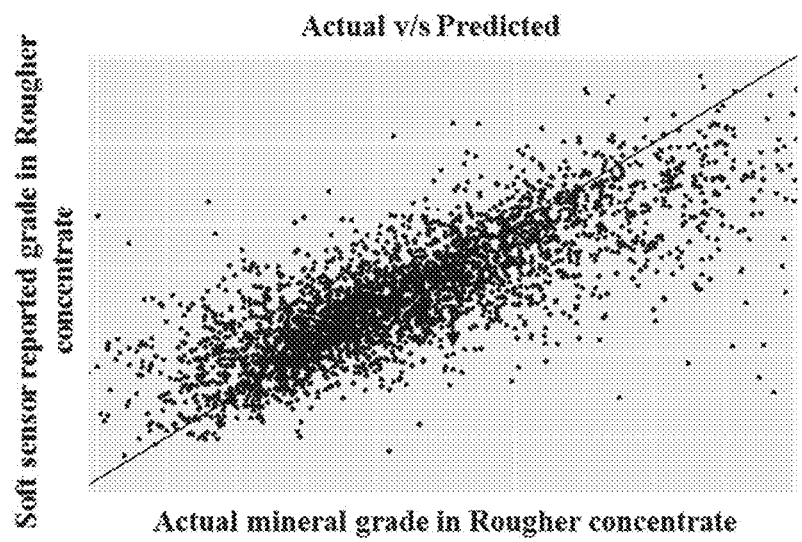

FIG. 9A and FIG. 9B illustrate predictive performance of a soft sensor of a particle size and metal grade, in accordance with an embodiment of the present disclosure. FIGS. 9A and 9B compare the predictions made by ML models of P80 from comminution circuit (80% passing particle size) and rougher grade of mineral A 112 with the actual plant data. Reasonable level of accuracy is obtained by these models considering only decision and disturbance variable as features.

Figure 10:
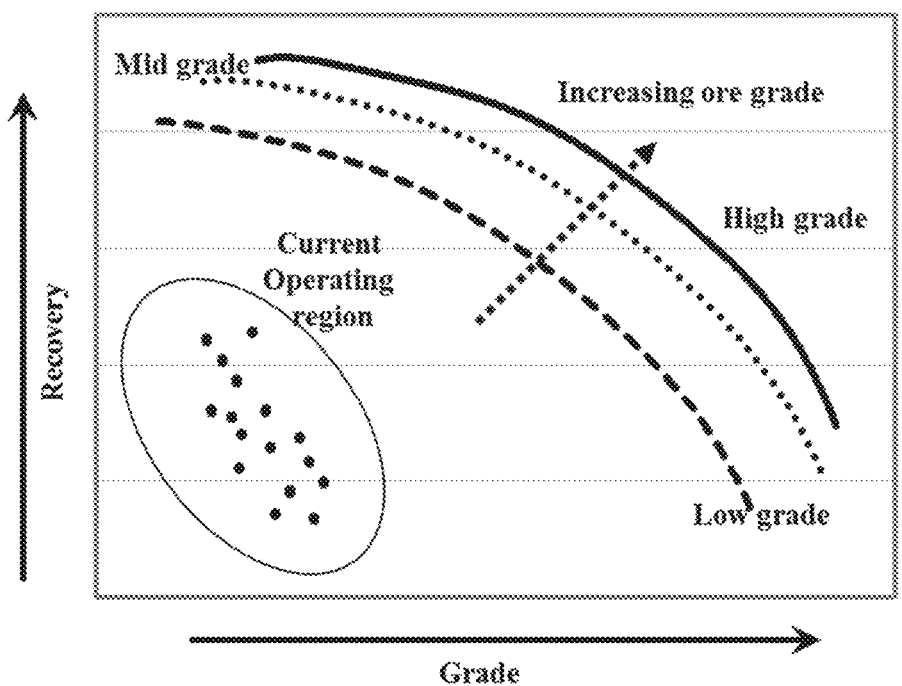
FIG. 10 illustrates an optimal performance curve obtained by multi-objective optimization of example KPIs namely overall recovery of mineral grade, in accordance with an embodiment of the present disclosure.

FIG. 10 illustrates an optimal performance curve obtained by multi-objective optimization of example KPIs for overall recovery of mineral and grade of the mineral, in accordance with an embodiment of the present disclosure. FIG. 10 shows a result of an optimization problem solved using an optimization module 114 comprising two objectives (Maximize grade of mineral A, maximize recovery of mineral B). The different lines show Pareto optimal front under different values of disturbance variable viz. ore feed grade. The filled black circles show achieved recovery and grade in absence of online monitoring and optimization thereby showing opportunity for process improvements.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for online monitoring and optimization of mining and mineral processing operations, the processor implemented method comprising:
   fetching from a plurality of data sources, by one or more hardware processors, data for a set of variables corresponding to a set of sensors associated with the mining and mineral processing operations;
   pre-processing, by the one or more hardware processors, the fetched data corresponding to the set of variables by discarding outliers, performing imputation for adding artificial values at missing positions, organizing data collected at different frequencies to one common frequency, identifying and selecting data based on steady state operation of a process or a sub-process associated with the mining and mineral processing operations;

determining, by the one or more hardware processors, standard operating condition for the mining and mineral processing operations using the pre-processed data corresponding to the set of variables;

segregating each variable among the set of variables into one of drilling-blasting operations, hauling operations, comminution operations, and flotation and concentration operations, wherein segregation is performed in accordance with a master tag list;

generating, by the one or more hardware processors, a set of models for the drilling-blasting operations, hauling operations, comminution operations, and flotation and concentration operations based on the segregated set of variables and preprocessed data, wherein the set of models are utilized to evaluate effect of a plurality to process parameters of interest on a set of Key Performance Indicators (KPIs) of interest associated with the drilling-blasting operations, hauling operations, comminution operations, and flotation and concentration operations, wherein the generated set of models comprise a set of Machine learning (ML) models or a set of individualized physics based models or hybrid models, and wherein the set of individualized physics based or hybrid models are generated for the plurality of process parameters based on known physics based models by determining model parameters using non-linear curve fitting;

simulating the generated set of models, by the one or more hardware processors, for current operating condition of the mining and mineral processing operations corresponding to the set of variables based on at least one of: the generated ML models, the set of individualized physics based or hybrid models of the KPIs and the plurality of process parameters, wherein the simulated current operating condition provides current values for KPIs and the plurality of process parameters of interest; and hierarchically optimizing, by the one or more hardware processors, the KPIs of interest of the mining and mineral processing operations to update the current operating conditions of a subset of variables among the set of variables of the mining and mineral processing operations, wherein the KPIs of interest are from at least one of mining operations, a comminution circuit, and a flotation and concentration circuit, wherein optimizing the KPIs of interest of the mining and mineral processing operations is in accordance with a phasewise and hierarchical procedure comprises:

creating drilling pattern and a preliminary charge pattern based on short term mining plan;

performing production drilling operations to collect Monitoring While Drilling (MWD) data, wherein the MWD data comprise information of drill rod revolution rate, rotary torque, pull down force, drilling rate, angular velocity and penetration rate;

using the MWD data and drilling pattern to estimate the geotechnical parameters comprising specific fracture energy and blasting parameters, further comprising, air deck length, stemming height for each hole to be blasted;

designing a preliminary charge plan, comprising information of charge mix for each of the hole, based on the estimated geotechnical parameters and drilling pattern;

estimating fragment size distribution (FSD) using the generated models, wherein the generated models utilize the estimated blasting parameters and the designed charge plan, wherein the estimated FSD along with relevant process parameters are used to simulate the expected KPIs of mining operations comprising hauling costs, stockpile throughput, flyrock size, velocity and range and cost of explosives;

utilizing the estimated FSD and the process parameters relevant for the mining and mineral processing operations to estimate KPIs of mineral processing operations comprising specific energy consumption, screening efficiency, particle size distribution at important points during comminution circuit along with recovery and grade of the mineral of interest in flotation and concentration circuit, using ML models, physics based and hybrid models; and recursively performing either one or all of the above steps to obtain optimized charge plan and set points of process parameters of mining and mineral processing operations that globally minimize a customized objective function expressed in terms of KPIs of interest.

2. The processor implemented method of claim 1, further comprising monitoring current operating condition of the set of variables in accordance with the pre-processed data of the set of variables corresponding to the mining and mineral processing operations to detect failure of one or more sensors from the set of sensors or failure of a process equipment, wherein the failure and a reason for the failure is indicated to a system administrator.

3. The method of claim 1, wherein the optimization of the KPIs of interest for the at least one of the mining operations, the comminution circuit, and the flotation and concentration circuit comprises:

formulating and solving optimization problem which comprises customizable combination of the KPIs of interest, modeled using the ML models the set of individualized physics based or the set of hybrid models, wherein solution of the optimization problem provides a set of values of the subset of variables, which are further communicated to a plurality of controllers and operators to improve the mining and mineral processing operations.

4. The method of claim 3, wherein the solution of the optimization problem provides:

recommendation of the charge plan including type and amount of explosives to be used; and set points for the plurality of controllers located at different positions along the comminution circuit, and flotation and concentration circuit.

5. The method of claim 1, wherein the set of sensors are associated with:

equipment and instrumentation installed for drilling, blasting or hauling operation required for mining operations or equipment and instrumentation installed in comminution circuit and, flotation and concentration circuit of mineral processing operations;

quality parameters of a plurality of streams of the mining and mineral processing operations, comprising raw material, product and intermediate streams and data corresponding to daily raw material processed;

source and quantity and data related to characterization of the raw materials of different types being processed; and process records containing data corresponding to equipment breakdown and maintenance history, environmental and weather conditions, and rock and terrain properties.

6. The method of claim 1, wherein the plurality of KPIs of interest for which the set of models are generated comprise cost of blasting operations, fragment size distribution, flyrock formation including size, range and maximum velocity, hauling cost, throughput to stockpile, screening efficiency, specific energy consumption, particle size distribution, comminution circuit throughput, grade and recovery of mineral of interest in output streams of the flotation and concentration circuit.

7. The method of claim 1, wherein the plurality of process parameters of interest for which the set of models is generated are used as soft sensors, and wherein the soft sensors provide real time or near real time prediction of infrequently measured or unmeasured critical process parameter or one or more parameters specific to each mining and mineral processing operation.

8. A system for online monitoring and optimization of mining and mineral processing operations, the system comprising:
  a memory storing instructions;
  one or more communication interfaces; and
  one or more hardware processors coupled to the memory via the one or more communication interfaces, wherein the one or more hardware processors are configured by the instructions to:
  fetch from a plurality of data sources data for a set of variables corresponding to a set of sensors associated with the mining and mineral processing operations;
  pre-process the fetched data corresponding to the set of variables by discarding outliers, performing imputation for adding artificial values at missing positions, organizing data collected at different frequencies to one common frequency, identifying and selecting data based on steady state operation of a process or a sub-process associated with the mining and mineral processing operations;
  determine standard operating condition for the mining and mineral processing operations using the pre-processed data corresponding to the set of variables;
  segregate each variable among the set of variables into one of a drilling-blasting operations, hauling operations, comminution operations, and flotation-and concentration operations, wherein segregation is performed in accordance with a master tag list;
  generate a set of models for the drilling-blasting operations, hauling operations, comminution operations, and flotation and concentration operations based on the segregated set of variables and preprocessed data, wherein the set of models are utilized to evaluate effect of a plurality to process parameters of interest on a set of Key Performance Indicators (KPIs) of interest associated with the drilling-blasting operations, hauling operations, comminution operations, and flotation and concentration operations, wherein the generated set of models comprise a set of Machine learning (ML) models, or a set of individualized physics based models or hybrid models, and wherein the set of individualized physics based models or hybrid models are generated for the plurality of process parameters based on known physics based models by determining model parameters using non-linear curve fitting;
  simulate the generated set of models for current operating condition of the mining and mineral processing operations corresponding to the set of variables based on at least one of: the generated ML models, the individualized physics based, the set of hybrid models of the KPIs and the plurality of process parameters, wherein the simulated current operating condition provides current values for KPIs and the plurality of process parameters of interest; and
  hierarchically optimize the KPIs of interest of the mining and mineral processing operations to update the current operating conditions of a subset of variables among the set of variables of the mining and mineral processing operations, wherein the KPIs of interest are from at least one of mining operations, a comminution circuit, and a flotation and concentration circuit, wherein optimizing the KPIs of interest of the mining and mineral processing operations is in accordance with a phase-wise and hierarchical procedure comprises:
    creating drilling pattern and a preliminary charge pattern based on short term mining plan;
    performing production drilling operations to collect Monitoring While Drilling (MWD) data, wherein the MWD data comprise information of drill rod revolution rate, rotary torque, pull down force, drilling rate, angular velocity and penetration rate;
    using the MWD data and drilling pattern to estimate the geotechnical parameters comprising specific fracture energy and blasting parameters, further comprising, air deck length, stemming height for each hole to be blasted;
    designing a preliminary charge plan, comprising information of charge mix for each of the hole, based on the estimated geotechnical parameters and drilling pattern;
    estimating fragment size distribution (FSD) using the generated models, wherein the generated models utilize the estimated blasting parameters and the designed charge plan, wherein the estimated FSD along with relevant process parameters are used to simulate the expected KPIs of mining operations comprising hauling costs, stockpile throughput, flyrock size, velocity and range and cost of explosives;
    utilizing the estimated FSD and the process parameters relevant for the mining and mineral processing operations to estimate KPIs of mineral processing operations comprising specific energy consumption, screening efficiency, particle size distribution at important points during comminution circuit along with recovery and grade of the mineral of interest in flotation and concentration circuit, using ML models, physics based and hybrid models; and
    recursively performing either one or all of the above steps to obtain optimized charge plan and set points of process parameters of mining and mineral processing operations that globally minimize a customized objective function expressed in terms of KPIs of interest.

9. The system of claim 8, wherein the one or more hardware processors are further configured to monitor current operating condition of the set of variables in accordance with the pre-processed data of the set of variables corresponding to the mining and mineral processing operations to detect failure of one or more sensor from the set of sensors or failure of a process equipment, wherein the failure and a reason for the failure is indicated to a system administrator.

10. The system of claim 8, wherein the one or more hardware processors are further configured to perform the optimization of the KPIs of interest for the at least one of the mining operations, the comminution circuit, and the flotation and concentration circuit by:
  formulating and solving optimization problem which comprises customizable combination of the KPIs of interest, modeled using ML models, the set of individualized physics based models or hybrid models, wherein solution of the optimization problem provides a set of values of the subset of variables, which are further communicated to a plurality of controllers and operators to improve the mining and mineral processing operations.

11. The system of claim 10, wherein the solution of the optimization problem provides:
   recommendation for charge plan including amount and type of explosives to be used; and
   set points for the plurality of controllers located at different positions along the comminution circuit, and flotation and concentration circuit.

12. The system of claim 8, wherein the set of sensors are associated with:
   equipment and instrumentation installed for drilling, blasting or hauling operation required for mining operations or equipment and instrumentation installed in the comminution circuit and, the flotation and concentration circuit of mineral processing operations;
   quality parameters of a plurality of streams of the mining and mineral processing operations, comprising raw material, final and intermediate products;
   source and quantity of raw materials processed and data related to characterization of the raw materials; and
   process records containing data corresponding to equipment breakdown and maintenance history, environmental and weather conditions, and rock and terrain properties.

13. The system of claim 8, wherein the plurality of KPIs of interest for which the set of models are generated comprise cost of blasting operations, fragment size distribution, flyrock formation including size, range and maximum velocity, hauling cost, throughput to stockpile, screening efficiency, specific energy consumption, particle size distribution, comminution circuit throughput, grade and recovery of mineral of interest in output streams of the flotation and concentration circuit.

14. The system of claim 8, wherein the plurality of process parameters of interest for which the set of models is generated are used as soft sensors, and wherein the soft sensors provide real time or near real time prediction of infrequently measured or unmeasured critical process parameter or one or more parameters specific to each mining and mineral processing operation.

15. One or more non-transitory machine readable information storage media storing instructions which, when executed by one or more hardware processors, causes the one or more hardware processors to execute a method comprising:
   fetching from a plurality of data sources data for a set of variables corresponding to a set of sensors associated with the mining and mineral processing operations;
   pre-processing the fetched data corresponding to the set of variables by discarding outliers, performing imputation for adding artificial values at missing positions, organizing data collected at different frequencies to one common frequency, identifying and selecting data based on steady state operation of a process or a sub-process associated with the mining and mineral processing operations;
   determining standard operating condition for the mining and mineral processing operations using the pre-processed data corresponding to the set of variables;
   segregating each variable among the set of variables into one of drilling-blasting operations, hauling operations, comminution operations, and flotation and concentration operations, wherein segregation is performed in accordance with a master tag list;
   generating, by the one or more hardware processors, a set of models for the drilling-blasting operations, hauling operations, comminution operations, and flotation and concentration operations based on the segregated set of variables and preprocessed data, wherein the set of models are utilized to evaluate effect of a plurality to process parameters of interest on a set of Key Performance Indicators (KPIs) of interest associated with the drilling-blasting operations, hauling operations, comminution operations, and flotation and concentration operations, wherein the generated set of models comprise a set of Machine learning (ML) models or a set of individualized physics based models or hybrid models, and wherein the set of individualized physics based or hybrid models are generated for the plurality of process parameters based on known physics based models by determining model parameters using non-linear curve fitting;
   simulating the generated set of models for current operating condition of the mining and mineral processing operations corresponding to the set of variables based on at least one of: the generated ML models, the set of individualized physics based or hybrid models of the KPIs and the plurality of process parameters, wherein the simulated current operating condition provides current values for KPIs and the plurality of process parameters of interest; and
   hierarchically optimizing the KPIs of interest of the mining and mineral processing operations to update the current operating conditions of a subset of variables among the set of variables of the mining and mineral processing operations, wherein the KPIs of interest are from at least one of mining operations, a comminution circuit, and a flotation and concentration circuit, wherein optimizing the KPIs of interest of the mining and mineral processing operations is in accordance with a phase-wise and hierarchical procedure comprises:
      creating drilling pattern and a preliminary charge pattern based on short term mining plan;
      performing production drilling operations to collect Monitoring While Drilling (MWD) data, wherein the MWD data comprise information of drill rod revolution rate, rotary torque, pull down force, drilling rate, angular velocity and penetration rate;
      using the MWD data and drilling pattern to estimate the geotechnical parameters comprising specific fracture energy and blasting parameters, further comprising, air deck length, stemming height for each hole to be blasted;
      designing a preliminary charge plan, comprising information of charge mix for each of the hole, based on the estimated geotechnical parameters and drilling pattern;
      estimating fragment size distribution (FSD) using the generated models, wherein the generated models utilize the estimated blasting parameters and the designed charge plan, wherein the estimated FSD along with relevant process parameters are used to simulate the expected KPIs of mining operations comprising hauling costs, stockpile throughput, flyrock size, velocity and range and cost of explosives;
      utilizing the estimated FSD and the process parameters relevant for the mining and mineral processing operations to estimate KPIs of mineral processing operations comprising specific energy consumption, screening efficiency, particle size distribution at important points during comminution circuit along with recovery and grade of the mineral of interest in flotation and concentration circuit, using ML models, physics based and hybrid models; and recursively performing either one or all of the above steps to obtain optimized charge plan and set points of process parameters of mining and mineral processing operations that globally minimize a customized objective function expressed in terms of KPIs of interest.

* * * * *